United States Patent
Mizutani et al.

(10) Patent No.: US 7,065,066 B2
(45) Date of Patent: Jun. 20, 2006

(54) COMMUNICATION METHOD, COMMUNICATION TERMINAL, WIRELESS AD-HOC NETWORK AND CELLULAR PHONE

(75) Inventors: Akihiko Mizutani, Zhushi (JP); Ryoji Honda, Saitama-ken (JP); Yasuharu Katsuno, Chigasaki (JP)

(73) Assignee: Lenovo (Singapore) Pte. Ltd, Singapore (SG)

( * ) Notice: Subject to any disclaimer, the term of this patent is extended or adjusted under 35 U.S.C. 154(b) by 792 days.

(21) Appl. No.: 09/809,576

(22) Filed: Mar. 15, 2001

(65) Prior Publication Data

US 2001/0022780 A1    Sep. 20, 2001

(30) Foreign Application Priority Data

Mar. 17, 2000  (JP)  .............................. 2000-076883

(51) Int. Cl.
*H04Q 7/24* (2006.01)
(52) U.S. Cl. ........................................ 370/338; 370/261
(58) Field of Classification Search ................ 370/321, 370/336, 337, 338, 347, 401, 458, 312, 313, 370/331, 390, 261
See application file for complete search history.

(56) References Cited

U.S. PATENT DOCUMENTS

| | | | | |
|---|---|---|---|---|
| 5,235,631 A | * | 8/1993 | Grube et al. | 455/509 |
| 5,299,199 A | * | 3/1994 | Wilson et al. | 370/347 |
| 5,481,254 A | * | 1/1996 | Gaskill et al. | 340/825.52 |
| 5,491,835 A | * | 2/1996 | Sasuta et al. | 455/509 |
| 5,530,914 A | * | 6/1996 | McPheters | 455/518 |
| 5,809,018 A | * | 9/1998 | Lehmusto | 370/330 |
| 5,821,984 A | * | 10/1998 | Ito et al. | 348/14.09 |
| 6,463,075 B1 | * | 10/2002 | Hoebeke | 370/458 |
| 6,600,928 B1 | * | 7/2003 | Ahya et al. | 455/518 |

* cited by examiner

*Primary Examiner*—Ricky Q. Ngo
*Assistant Examiner*—Christine Ng
(74) *Attorney, Agent, or Firm*—Anne V. Dougherty

(57) ABSTRACT

Group communication is performed in the wireless ad-hoc network that has a rearrangement frequency of connection higher than the communication frequency due to the movement of communication terminals 101 to 116. Communication terminals 101 to 116 stores the identification information and valid time periods of adjoining terminals into the group management table 11, as well as its own station's time period during which it belongs to the group, and send a packet with appending its own identification information and further a valid time period of the group based on the information about the valid time periods stored in the group management table 11.

16 Claims, 13 Drawing Sheets

Group management table 11

| | | | | | | | |
|---|---|---|---|---|---|---|---|
| Group 1 | Own station's time period 1 | Terminal ID 1 – A | Time period 1 – A | Terminal ID 1 – B | Time period 1 – B | | |
| Group 2 | Own station's time period 2 | Terminal ID 2 – A | Time period 2 – A | Terminal ID 2 – B | Time period 2 – B | | |
| Group 3 | Own station's time period 3 | Terminal ID 3 – A | Time period 3 – A | | | | |
| Group 4 | Own station's time period 4 | Terminal ID 4 – A | Time period 4 – A | Terminal ID 4 – B | Time period 4 – B | Terminal ID 4 – C | Time period 4 – C |
| Group 5 | Own station's time period 5 | Terminal ID 5 – A | Time period 5 – A | Terminal ID 5 – B | Time period 5 – B | | |

Fig. 4

| Group management table 11 | | | | | | |
|---|---|---|---|---|---|---|
| Group 1 | Own station's time period 1 | Terminal ID 1-A | Time period 1-A | Terminal ID 1-B | Time period 1-B | |
| Group 2 | Own station's time period 2 | Terminal ID 2-A | Time period 2-A | Terminal ID 2-B | Time period 2-B | |
| Group 3 | Own station's time period 3 | Terminal ID 3-A | Time period 3-A | | | |
| Group 4 | Own station's time period 4 | Terminal ID 4-A | Time period 4-A | Terminal ID 4-B | Time period 4-B | Terminal ID 4-C | Time period 4-C |
| Group 5 | Own station's time period 5 | Terminal ID 5-A | Time period 5-A | Terminal ID 5-B | Time period 5-B | |

Broadcast to network (first hop)

Broadcast to network (second hop)

Broadcast to network (third hop)

Generation of multicast group and communication in a group (first stage)

Generation of multicast group and communication in a group (second stage)

Generation of multicast group and communication in a group (third stage)

Generation of multicast group and communication in a group (fourth stage)

Generation of multicast group and communication in a group (fifth stage)

Generation of multicast group and communication in a group (sixth stage)

COMMUNICATION METHOD, COMMUNICATION TERMINAL, WIRELESS AD-HOC NETWORK AND CELLULAR PHONE

FIELD OF THE INVENTION

The present invention relates to an on-demand type of communication as typified by wireless ad-hoc network and, more particularly, to a method for bi-directional communication among a party composed of an unspecified number of terminals.

BACKGROUND OF THE INVENTION

In recent years, according to downsizing and weight saving of portable information terminals, it becomes possible to carry them easily and consequently they have been used among many users. Accordingly, many researches are conducted for constructing a wireless ad-hoc network as an on-demand type of communication, in order to freely exchanging information under a mobile environment. This wireless ad-hoc network is intended to provide communication means to send and receive data among terminals that have temporarily aggregated, as a form of mobile computing, in the context where distance and time get close; i.e., it is the network that is configured on demand by people having information terminals.

In this wireless ad-hoc network, there has been suggested a communication scheme that specifies as a destination not a specific terminal but a party that is based on the position of the recipient, time, or the user's matter of concern. As a physical layer supporting this, the broadcast relaying transmission is considered, which does not require infrastructure facilities such as a base station in the existing mobile communications, but employs the short-range wireless communication having the coverage of several tens of meters at the most. Also, as a situation where this communication is carried out, involuntary information exchanges between pedestrians or between a pedestrian and a shop, and a communication that is based on the same matter of things on the commuter train, etc., are assumed. Under such communication environments, since it is difficult to intensively manage the position information and the path information of terminals as a network, it is supposed that all communications are implemented as broadcast to the entire network. Note that broadcast means that the destination of data shall not be specified and data are to be sent to an unspecified number of partners.

On the other hand, as an existing communication scheme, there is multicast that sends the same data to a plurality of specified destinations. In the multicast, a packet is selectively relayed so that it is expected that communication transmission may be possible with a smaller amount of communication than broadcast. Among multicast communication schemes, ODMRP (On Demand Multicast Routing Protocol) is cited as what can best correspond to an ad-hoc environment and the change of topology of the network.

In the ODMRP, a terminal that transmits to the group regularly broadcasts a member information of the group to the entire network. When a receiving terminal participating in this group receives this member information, it updates the member table it owns and sends back the member table to the sender via the opposite path against the broadcast. With these information exchanges, information about members and paths is always updated among all members. In this ODMRP, many problems when applying multicast to an ad-hoc network are solved by reason that a specific server is not required, and a multicast group is first generated automatically when a packet exists, etc. Also it is advantageous that an amount of communication is held to a minimum when an amount of communication in the group is much greater than frequencies of broadcast of member information.

On the other hand, using broadcast as the lower layer in the communication with a party sharing such a topic, information is screened only by filtering at a receiving terminal. Even in the scheme using broadcast for the lower layer, it is possible, in case of a uni-directional communication such as an advertisement, to restrain an increase of packets by limiting the frequency of the transmission of information. However, in case of bi-directional communications such as when providing information from a peripheral terminal in response to a query from a terminal or exchanging information among people sharing a hobby, congestion may easily occur and lead to a traffic explosion. Further, each portable terminal would use radio wave resources more than necessary because of retransmission to a terminal having no interest in the information, so that valuable electric power and information processing capacity would be wasted. Such a tendency is particularly eminent where the scale of network becomes greater, and the ratio of participants in a party in the network is smaller. Therefore, it is practically doubtful to establish a bi-directional communication with a party by relying entirely on broadcast.

Seen from another standpoint, when establishing a communication with a party by means of multicast communication such as the ODMRP, there is a trouble where the transmission of control information for the group management occurs overheads. In particular, in a case where a couple of replies are expected at most in response to a query, the broadcast for control information would need more communication than actual information. Further, in a case where terminals are moving actively, a situation where the path has already been nullified would occur when attempting to send a packet to the group. Therefore, a management method, such as a conventional multicast communication, which assumes a group that will persistently continue to exist, is not applicable to the communication among the group such as pedestrians who go through a road, where the active movement occurs.

In order to solve the above-mentioned problems, it is an object of the present invention to enable, in an on-demand type of communication where the active movement occurs, the bi-directional communication among a party composed of an unspecified number of terminals that share a topic. It is another object of the invention to dramatically reduce a traffic in the network among the same group, as well as to reduce power consumption of communication terminals. It is a further object of the invention to continue communication without a break among the remaining terminals even if a given communication terminal moves out of communication range.

SUMMARY OF THE INVENTION

In light of these purposes, the present invention prevents unnecessary communications to communication terminals having no interest in the communication content and to terminals that move out of communication range, when performing the broadcast relaying transmission to an unspecified number of communication terminals under a network environment where the terminals are moving actively. Therefore, the present invention is the communication method for performing a group communication among a plurality of communication terminals, the method comprising the steps of: setting a valid time period on each of communication terminals performing the group communication, wherein the valid time period is longer than a time for back-and-forth transfer between adjoining communication terminals, and is shorter than an expected time for the communication terminals to go out of communication range; and communicating among a group of remaining communication terminals except a communication terminal that exceeds the set valid time period.

It is characterized in that, this group communication is performed in a wireless ad-hoc network that has a rearrangement frequency of connection higher than a communication frequency due to the movement of communication terminals.

Further, it is characterized in that, the communication terminals performing the group communication recognize their own time period to belong to the group, information about adjoining terminals belonging to the group, and time periods for these adjoining terminals to belong to the group, then it is preferable that the group is managed decentralizedly according to the life time of each communication terminal. This recognition is accomplished, for example, as follows; i.e., each communication terminal owns a group management table, wherein each time period and information are managed based on each group. Besides, the time when a communication terminal is expected to go out of communication range is determined, considering the place where the group would be formed and the communication scheme, etc.

Also, the present invention is directed to the communication method to perform an on-demand type of group communication among a plurality of communication terminals, wherein a terminal that communicates sends a packet with appending the information about a valid time period of the group, as well as its own identification information, then a terminal that received the packet storing the identification information and the information about the valid time period that are included in the packet, and a communication terminal performing the group communication transferring a packet based on the stored identification information and the information about the valid time period. This identification information is, for example, an originator ID appended to the header of the packet.

Now, it is characterized in that, the communication terminal that received the packet stores the identification information and the information about the valid time period in a management table for each group, then it is advantageous that the group management is easy and being able to take prompt action on participation/withdrawal of communication terminals in/out of a group.

Also, it is characterized in that, a communication terminal performing the group communication determines whether the valid time period has been exceeded based on the stored information about the valid time period, and then prohibits transferring a new packet to the communication terminal that has exceeded the valid time period, thereby unnecessary communications are preferably avoided.

Moreover, it is characterized in that, communication terminals performing the group communication determine whether the valid time period has been exceeded based on the stored information about the valid time period, and then prohibit transferring new packets to the communication terminals that have exceeded the valid time periods.

In another aspect, the present invention is directed to a communication method for performing a group communication in a wireless ad-hoc network that has a rearrangement frequency of connection higher than the transmission frequency of communication packets due to the movement of communication terminals, the method comprising the steps of: forming a group composed of an unspecified number of communication terminals that communicate; providing a short life time to this group, wherein the communication terminals extend this life time if necessary; and decentralizedly managing this group based on the life time of the communication terminals. As stated above, this life time is provided within the period of time where a communication terminal comprising the group is expected to go out of communication range. In order for the life time of the group to be updated upon the transmission of packets, the life time of the group is preferably updated whenever a packet is transmitted, thereby the problems where the communicating group would disappear due to its life time are solved.

In a further aspect, in order to accomplish the above purposes, the present invention is directed to a communication terminal that enables an on-demand type of group communication, the communication terminal comprising: time period setting means for setting a valid time period during which the terminal itself belongs to the group; and communication means for sending a packet with appending the information about the valid time period set by the time period setting means, as well as its own identification information.

It is characterized in that, this time period setting means sets its own valid time period based on a valid time period of the adjoining terminal sent from that terminal.

Also, this time period setting means is configured, for example, in a communication terminal that first starts transmission, to set the valid time period that is longer than a time for back-and-forth transfer of a packet and is shorter than an expected time for itself to go out of communication range. Here the communication terminals include various types of portable devices such as cellular phones and notebook computers.

In a further aspect, the present invention is directed to a communication terminal that enables an on-demand type of group communication, the communication terminal comprising: a storage section for storing identification information of adjoining terminals that belong to a group that performs the group communication, as well as valid time period information during which the adjoining terminals belong to the group; and a sending section for sending data to the adjoining terminals whose valid time periods have not been exceeded, based on the identification information and the valid time period information stored in the storage section.

It is characterized in that, the storage section stores the identification information and the valid time period information of the adjoining terminals into the group management table, as well as its own station's time period during which it belongs to the group. Further, the own station time period stored in this group management table may be updated based on the valid time periods of the adjoining terminals.

Furthermore, it is characterized in that, this storage section deletes from the group management table the information about the adjoining terminal that have exceeded their valid time periods based on the valid time period information, so that the transfer is easily done based on this group management table.

According to a further aspect, the present invention is directed to a wireless ad-hoc network that has a rearrangement frequency of connection higher than the transmission frequency of communication packets due to the movement of communication terminals, comprising the steps of: setting for each packet, a valid time period that is longer than a time for back-and-forth transfer of the communication packet and that is shorter than an expected time for the communication terminals to go out of communication range; and performing an on-demand type of group communication in the group within the valid time period. According to this, it is possible to prevent wasting the resources of portable devices (computing power, storage capacity, electric power, etc.).

In a further aspect, the present invention is directed to a cellular phone that enables an on-demand type of group communication, the cellular phone comprising: time period setting means for setting a valid time period during which the cellular phone itself belongs to a group; and communication means for sending a packet with appending the information about the set valid time period, as well as its own identification information. It is characterized in that, this time period setting means sets its own valid time period based on a valid time period of the adjoining cellular phone sent from that cellular phone. Also, it is characterized in that, this time period setting means sets the valid time period that is longer than a time for back-and-forth transfer of the packet and is shorter than an expected time for itself to go out of communication range. In this way, applying the present invention to cellular phones, the bi-directional communication becomes possible among a party composed of an unspecified number of cellular phones that share a topic.

BRIEF DESCRIPTION OF THE DRAWINGS

The invention will now be described in greater detail with specific reference to the appended drawings:

FIG. 4 is a diagram illustrating a configuration of the group management table 11;

DETAILED DESCRIPTION OF THE INVENTION

Figure 1:
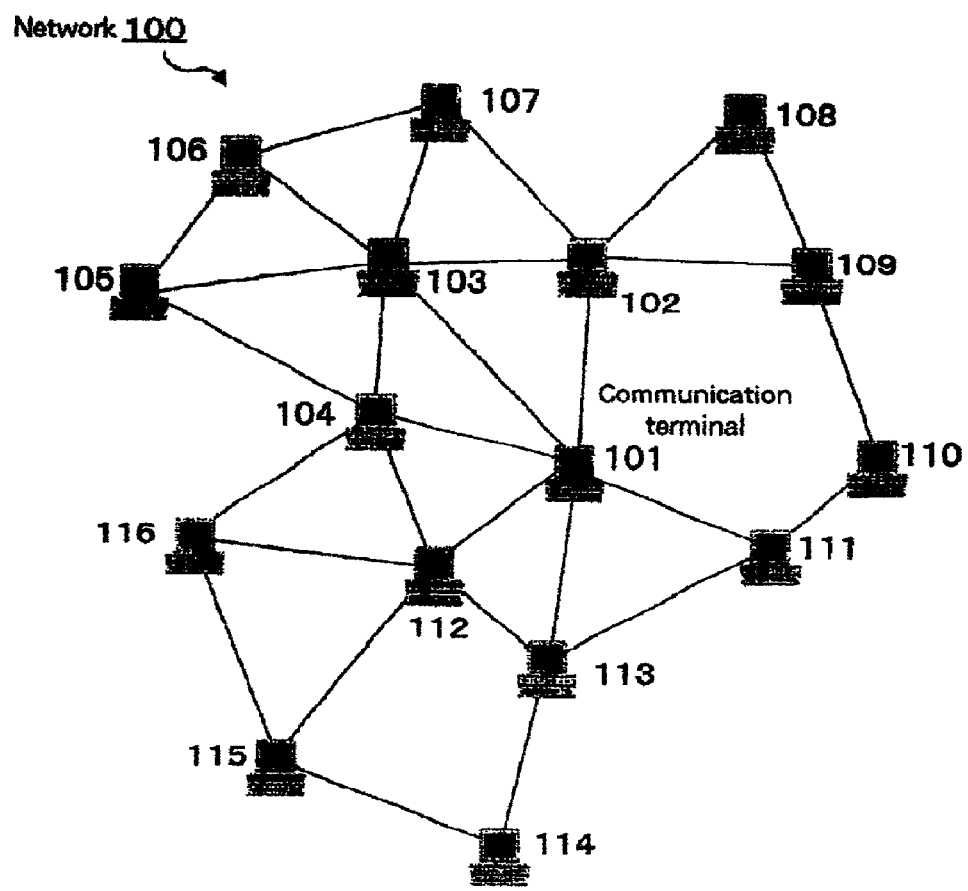
FIG. 1 depicts an example of an on-demand type of communication network where an embodiment of the present invention is applied.

Now the present invention will be described in detail referencing the attached drawings. FIG. 1 depicts an example of an on-demand type of communication network where an embodiment of the present invention is applied. In the embodiment, a wireless ad-hoc network where the active movement occurs is assumed, while FIG. 1 shows a momentary condition where the network 100 has been formed with 16 terminals of communication terminals 101–116. No particular repeater exists in this network and all packets are assumed to be relayed by the other terminals within the coverage to propagate in the network. Also, it is assumed that each communication terminal can bi-directionally communicate with an adjoining terminal within the coverage with one-to-one relation. The lines connecting the communication terminals 101–116 shown in FIG. 1 show such communication paths. In the network 100 according to the embodiment, it is assumed that communication terminals 101 to 116 move frequently, but for about a time for the communication terminals 101 to 116 to send a packet and after that receive a plurality of automatic responses, they remain stable. However, it is assumed that after the time has passed to the extent that a user would respond with a conscious operation, a change to a completely different topology might occur in the environment.

Figure 2:
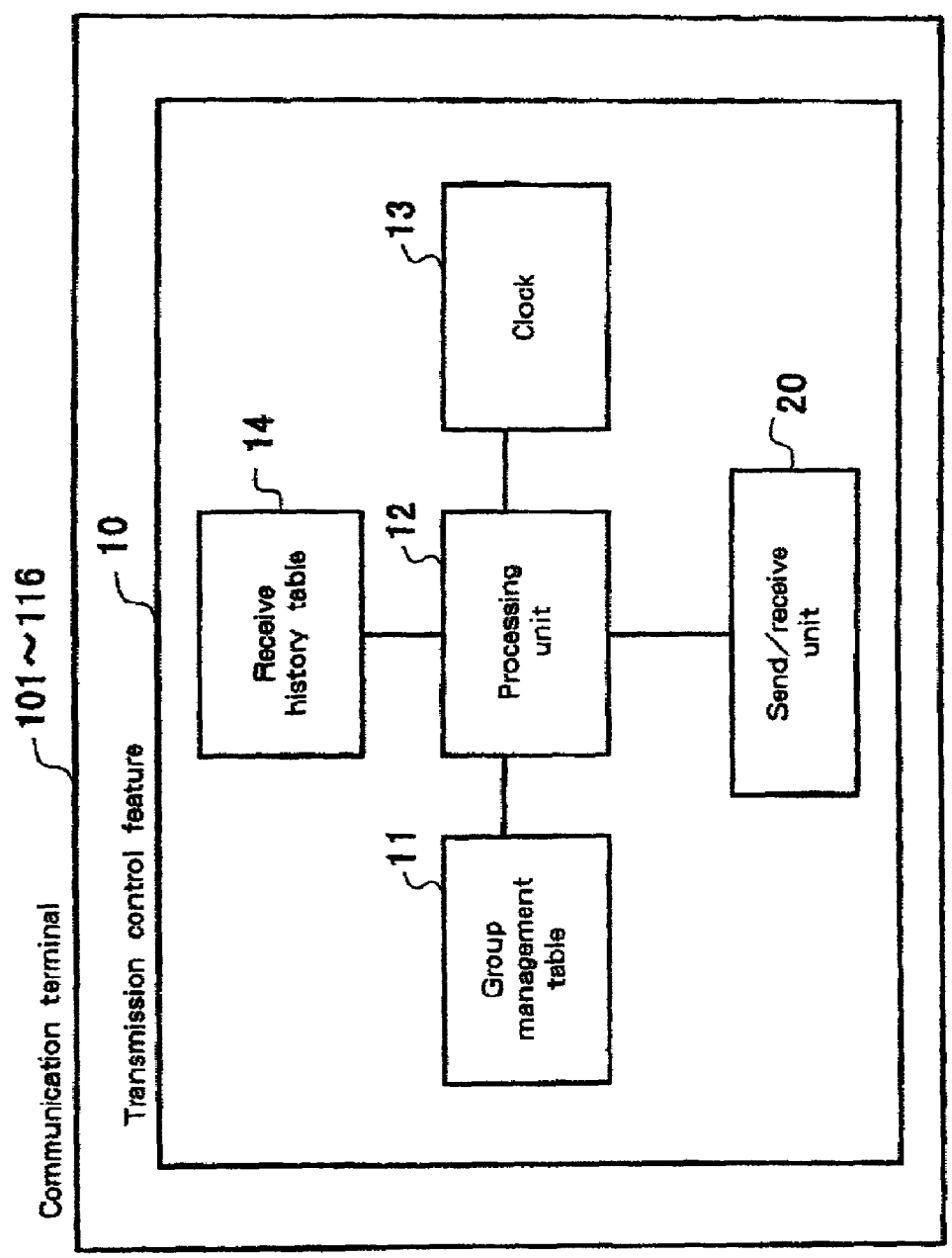
FIG. 2 is a block diagram showing the configuration of communication terminals 101 to 116.

FIG. 2 is a block diagram showing the configuration of communication terminals 101 to 116. The communication terminals 101 to 116 in the embodiment principally consist of a transmission control feature 10 and a send/receive unit 20. The transmission control feature 10 includes a group management table 11 that is used for managing a group, a processing unit 12 for controlling the wholeness, a clock 13 for measuring a valid time period of a packet and a time period of belonging to the group, and a receive history table 14, which shows the configuration of part of a cellular telephone. In this receive history table 14, IDs and valid time periods of all received packets are stored. Then, if communication packets received later are the same as those which are stored in this receive history table 14, they are ignored and will not be retransferred. In addition, the packet information that has exceeded the valid time period is deleted. Also, this group management table 11 functions as a storage section that stores each type of information for use in the group management. Furthermore, the processing unit 12 plays a role of time period setting means that set and update the own station's time periods according to the group management table 11. In addition, the clock 13 is used to generate a time period information to be appended to the packet and to check each type of time period information that has been stored in the group management table 11, therefore it functions as a timer or absolute time. The send/receive unit 20 sends packets that have been generated, and receives packets from other communication terminals; that is, it functions as sending means and receiving means. Each communication terminal 101 to 116 in the embodiment is given a unique identifier respectively, which is sent as an originator ID via a packet, as will be described later.

In the embodiment, all communication are performed for a party. Here the party refers to an aggregate of an unspecified number of communication terminals that share the same interest. A communication terminal 101 to 116 that desires to communicate in this party, forms a momentary group with adjoining communication terminals and avoids the increase of the amount of communication attendant on broadcast by communicating only with the members of this group. Also setting the life time of the group to an extremely short time of the order of back-and-forth transfer of a packet, even if a specific communication terminal moves during the life time of the group, the topology would not change. According to this, it becomes possible to avoid an overhead attendant on the management of members of the group. Moreover, the life time of the group is configured to be updated whenever each communication terminal 101 to 116 sends a packet. On this account, the group under communication never disappears due to its life time. Since a communication terminal that has ceased from communication due to its movement can not send a new packet, the life time of the group ends and this communication terminal withdraws from the group. When this communication terminal wants to resume communication, it is possible to generate a new group that belongs to the same party.

Figure 3:
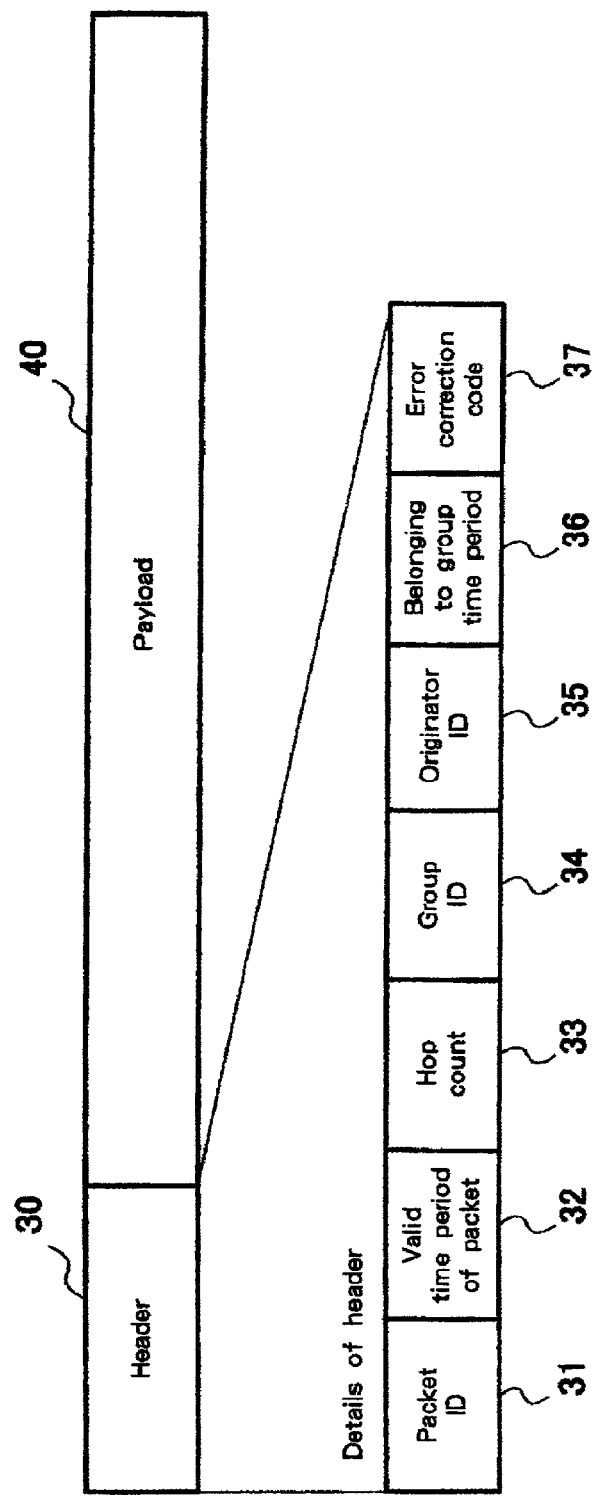
FIG. 3 depicts a formation of a packet that is sent and received.

FIG. 3 depicts a formation of a packet that is sent and received. The structure of the packet that is used in the embodiment of the present invention consists of header 30 and payload 40 that is the content of data. The header 30 consists of packet ID 31, valid time period of packet 32, hop count 33, group ID 34, originator ID 35, belonging to group time period 36, and error correcting code 37. Packet ID 31 is an identifier of the packet and may include a group generation flag that identifies a group generation packet. Specifically, a combination of a originator and a serial number, or random numbers of appropriate length, etc. are used. Also a hash value of payload 40 can be substituted, in this case the packet ID 31 may be omitted. A packet that is given the group generation flag is broadcasted, while a common packet is transferred in the group. In valid time period of packet 32 is set the time period, during which the packet being sent is valid. A packet that has exceeded this time period is thrown away without being transferred. Hop count 33 is the maximum value where the packet is relayed and transmitted. One is decremented each time of transfer by the relay terminals. A packet whose hop count 33 has become 0 can not be transferred. However, the hop count 33 is not needed when the transfer range is not controlled by the number of hops. Group ID 34 is a unique identifier given to a group. Originator ID 35 is a unique identifier of the originator (relay terminal in case of a relayed packet). Belonging to group time period 36 is the time period during which the originator will belong to this group, and is unnecessary when it is set as the same as the valid time period of packet 32. Error correcting code 37 is a code such as CRC (Cyclic Redundancy Check), which detects and corrects a transmission error in the header 30. Note that the valid time period of packet 32 and the belonging to group time period 36 may be represented as the life time by an absolute time, or may be represented with the life time such as 80 seconds as it is.

FIG. 4 is a diagram illustrating a configuration of the group management table 11. In the embodiment of the present invention, with the reception of the above-mentioned packet, an adjoining communication terminal that sent the packet is registered as a member. The group management table 11 shown in FIG. 4 stores group names each shown by group 1 to 5, own station's time periods 1 to 5 set for each group, terminal IDs of communication terminals that constitute the group, and time periods for each terminal ID. Concerning these group ID 1 to 5, when a terminal itself sends as a sending terminal, its group ID is registered, while it receives as a relay station from other terminals, the content shown in the group ID 34 of the packet shown in FIG. 3 is registered. For the time periods of each terminal ID, the belonging to group time period 36 of the received packet (or the valid time period of packet 32 if the belonging to group time period 36 does not exist) is registered. For the own station's time periods, the longest time period among the time periods for belonging to group time period 36 of packets that have been transmitted or relayed in the same group ID (or the valid time period of packet 32 if the time periods for belonging to group time period 36 do not exist), is registered as an own station's time period. The registered own station's time period will be used as the valid time period of the group.

Figure 5:
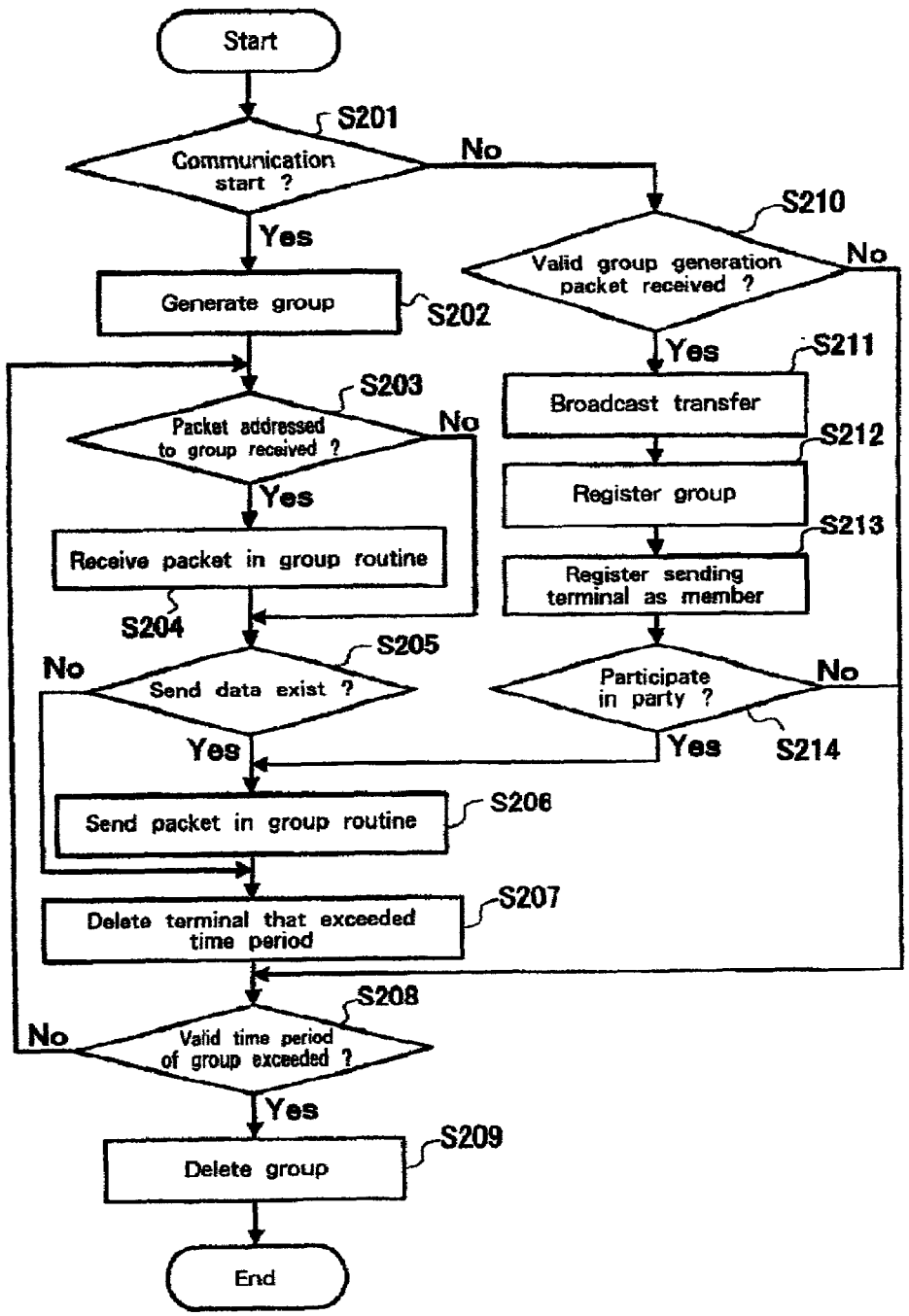
FIG. 5 is a flowchart illustrating the concrete communication procedure in the embodiment of the present invention.

FIG. 5 is a flowchart illustrating the concrete communication procedure in the embodiment of the present invention. First, when starting the communication at each communication terminal (step 201), a group is generated (step 202), and a group generation packet is sent to a party corresponding to the destination. Then, the generated group is registered to the group management table 11 as stated above, and at the same time registers the belonging to group time period 36 that it set by itself as the own station's time period. At this point, members of the group have not been registered to the group management table 11.

On the other hand, at each communication terminal, it is determined whether a packet addressed to the group has been received (step 203). If received, receive packet in group routine described later is executed (step 204). Thereafter, it is determined whether send data to be sent to the group exist (step 205). If the packet addressed to the group has not been received in step 203, skipping the receive packet in group routine and performing the determination of step 205. If the send data exist in step 205, send packet in group routine described later is executed (step 206). Thereafter, terminals that have exceeded the time periods are deleted from the group (step 207). No send data exist in step 205, skipping the send packet in group routine and performing step 207. Thereafter, it is determined whether the valid time period of the group has been exceeded (step 208). If exceeded, the group is deleted from the group management table 11 (step 209), and the communication procedure ends. If the valid time period of the group has not been exceeded in step 208, the process is repeated from step 203.

On the other hand, if the terminal dose not start communication first in step 201, it is determined whether the valid group generation packet has been received (step 210). If not received, the process goes to step 208. If received, packets are broadcasted (step 211). The algorithm of broadcast may be anything as long as it does not cause an infinite loop. A packet that has exceeded the valid time period is thrown away without being retransferred. Each communication terminal adds this group to a new group management table 11, and registers the group (step 212). Then, it registers the adjoining terminal that sent the packet as a member (step 213). Thereafter, it is determined whether it participates in the party (step 214). If YES, packets are sent according to the send packet in group routine in step 206, and the own station's time period is updated. This communication is necessarily performed before the end of the valid time period of packet 32. Communication terminals that have no intention to participate in the party wait for the valid time period of the group to end in step 208, however, it participates in the group if it received a packet addressed to the group.

In this way, there is set a relatively short valid time period of packet 32 in the packet, and broadcasted over the entire network. Owing to this valid time period, each communication terminal can specify the size of the group. As shown in FIG. 3, the belonging to group time period 36 is also specified in the packet. This belonging to group time period 36 should be twice or more the valid time period of packet 32. This corresponds to a time where a packet be transmitted to an outermost communication terminal in the coverage, and a response be received. The belonging to group time period 36 should be set small enough compared with the estimated time, where the topology has changed due to the movement of communication terminals and a communication among the members becomes impossible.

Figure 6:
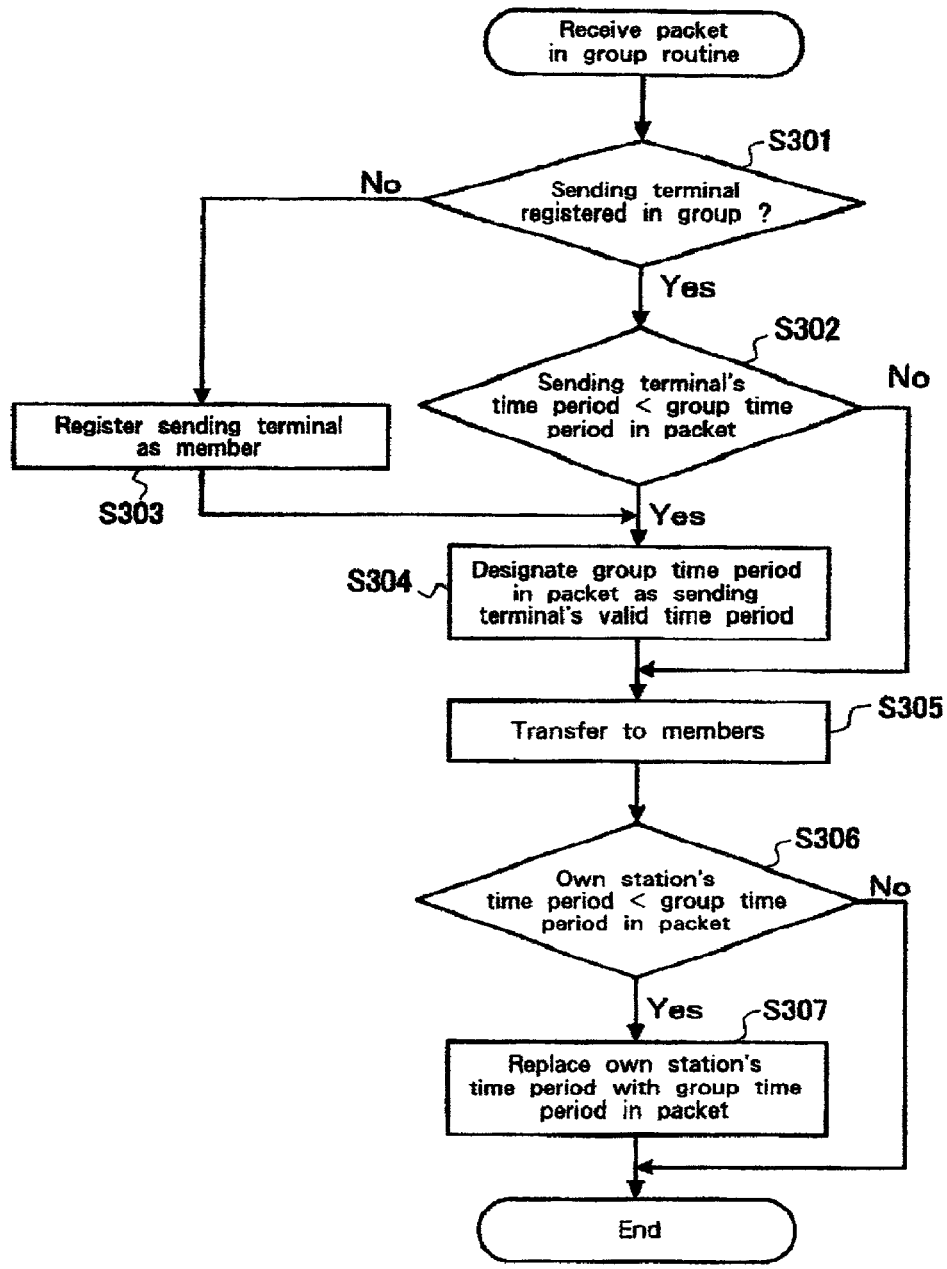
FIG. 6 is a flowchart illustrating the receive packet in group routine shown in step 204 of FIG. 5.

FIG. 6 is a flowchart illustrating the receive packet in group routine shown in step 204 of FIG. 5. First, a receiving terminal examines whether the sending terminal (communication terminal) that sent the packet is registered in the group management table 11 (step 301). If not registered, it adds the sending terminal as a member and registers with the group management table 11 (step 303), and registers the belonging to group time period 36 specified in the packet with the group management table 11 as the valid time period of the sending terminal (step 304). If the sending terminal has already been registered in step 301, the valid time period of this sending terminal (the time periods of each terminal ID) is compared with the belonging to group time period 36 in the packet (step 302). If the belonging to group time period 36 in the packet is longer, the valid time period of the sending terminal is updated with the belonging to group time period 36 in the packet (step 304). If the belonging to group time period 36 in the packet is shorter, the update of the time period in the group management table 11 is skipped and goes to the next processing. Next, the packet that was sent from the sending terminal is retransferred to the members (except the sender) that are registered to the group (step 305). Then, the valid time period of the group of its own station (own station's time period) is compared with the belonging to group time period 36 in the packet (step 306). If the own station's time period is longer, the process ends. If the own station's time period is shorter, the own station's time period is replaced with the time period of the group (step 307) and the receive packet in group routine ends.

Figure 7:
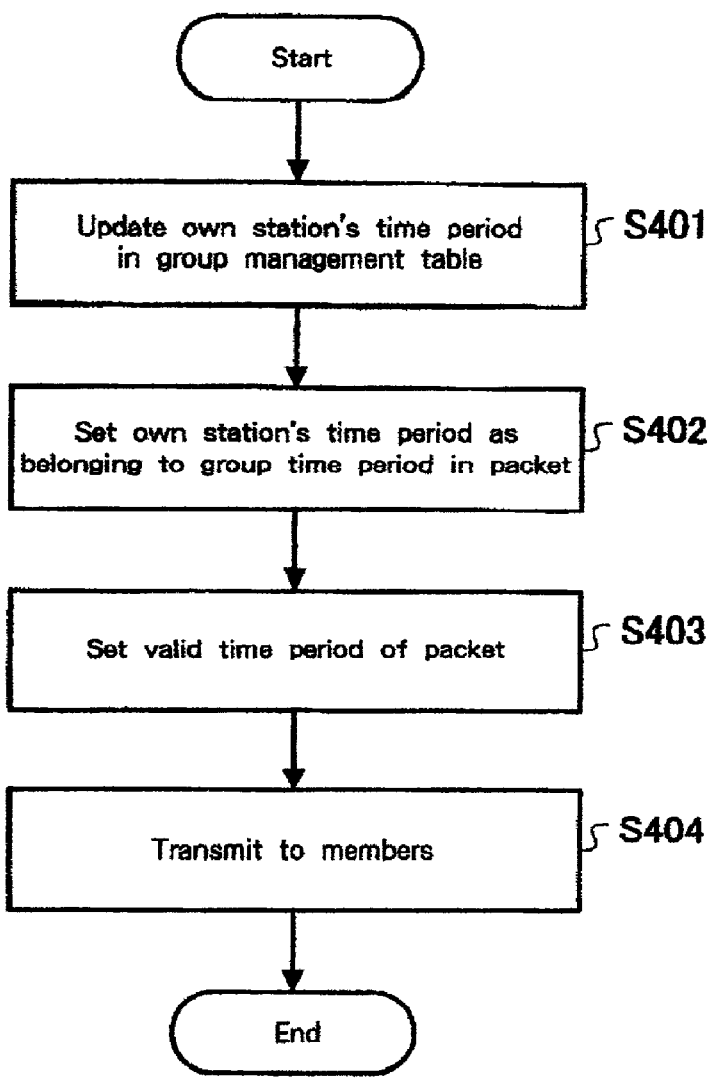
FIG. 7 is a flowchart illustrating the send packet in group routine shown in step 206 of FIG. 5.

FIG. 7 is a flowchart illustrating the send packet in group routine shown in step 206 of FIG. 5. The sending terminal updates the own station's time period in the group management table 11 (step 401), and sets the updated own station's time period as the belonging to group time period 36 in the packet (step 402). Also, it sets the valid time period of packet 32 (step 403). Then, it transmits the packet that has stored the belonging to group time period 36 and the valid time period of packet 32 to the members (step 404).

In this way, according to the embodiment of the present invention, each communication terminal 101 to 116 manages the members based on the valid time period of the group. The valid time period of the group is different for each communication terminal 101 to 116. As mentioned above, the adjoining terminals that have not sent new packets before the valid time period of the group are precluded from a member of the management table. A member that wants to continuously participate in the group must necessarily update the valid time period of the group by sending a packet before the valid time period of the group of its own station. The group whose valid time period of the group has been exceeded is deleted from the group management table 11. Also, it will be deleted from the list of members of the table of the adjoining terminals. In this way, the group is decentralizedly managed, wherein the terminals that have not involved in communication will automatically disappear.

Note that the above-mentioned party is an aggregate of an unspecified number of communication terminals that share the same interest, as was assumed in the embodiment of the invention. This party may be implemented by the following:
1. An index (ID) according to the classification that was arranged in advance among all communication terminals.
2. Keywords by means of a natural language.

In the case 1, it is possible to use party ID directly as a destination of a packet being communicated. This does not need much processing capacity of the communication terminal, and especially better-suited for information collection by means of unconscious automatic communication. On the other hand, in the case 2, a communication about a much wider topic becomes possible. By giving a group ID 34 and a keyword into a packet, subsequent communications to the party could be performed against this group ID 34. This group ID 34 may be given by the originator ID 35 and a serial number or may be a random number of appropriate length.

For the physical layer of the network, wireless communication based on spread spectrum technique in 2.4 GHz band is used. The communication speed is assumed to be about 1 Mbps.

Major spreading schemes include two approaches; i.e. direct sequence and frequency hopping. Assuming that each communication terminal 101 to 116 has a unique spreading code and transmits a communication using the code of the receiving terminal. In order to signal the IDs and spreading codes of communication terminals 101 to 116, particular codes are prepared. Since it is difficult to adjust the spreading codes of peripheral terminals in an ad-hoc environment, it is impossible to broadcast with the lower layer over the gamut of periphery, so that the communication between the adjoining terminals is performed with one-to-one relation.

Figure 8:
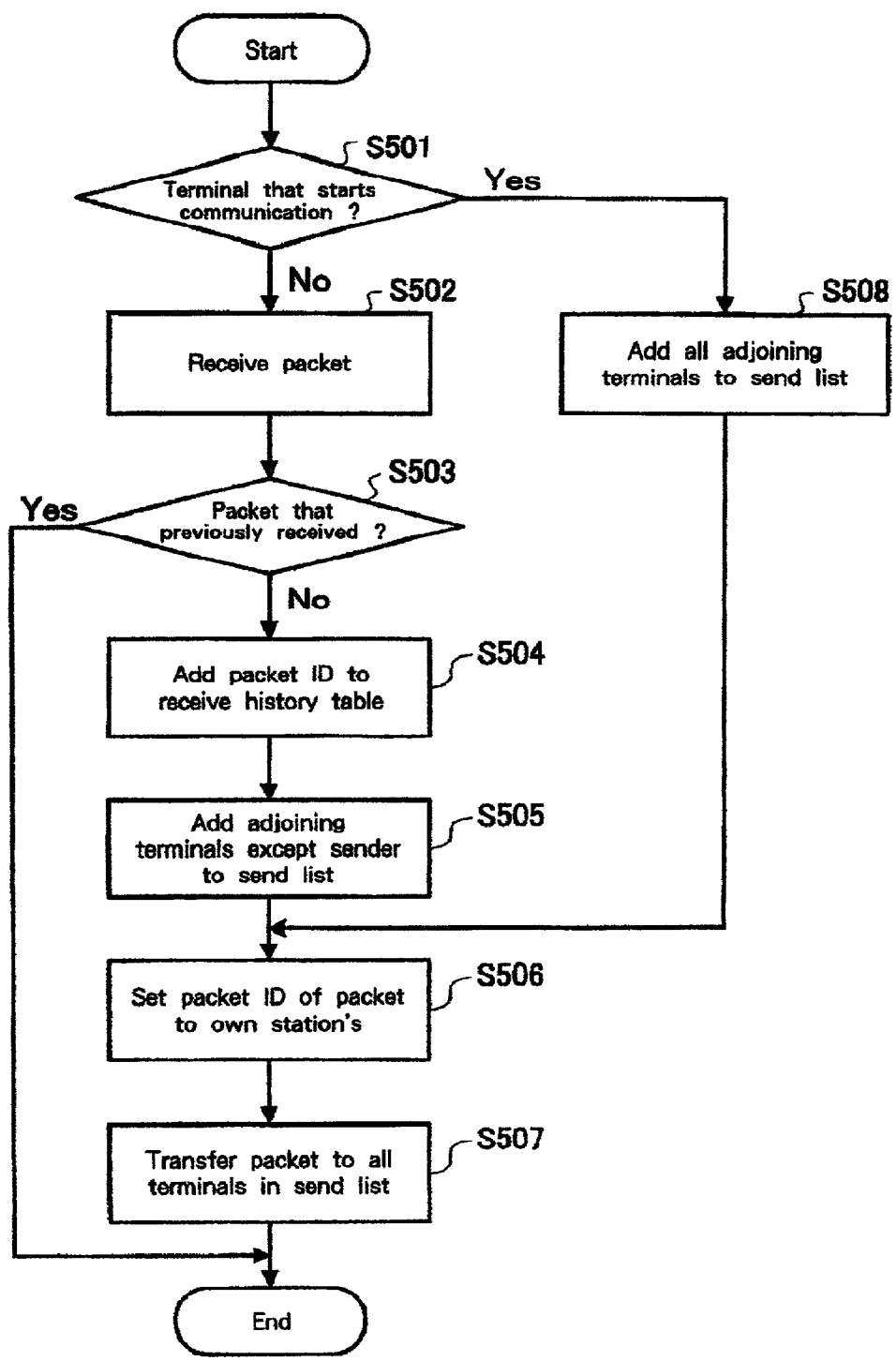
FIG. 8 is a flowchart illustrating the procedure of broadcast upon generating a group.

FIG. 8 is a flowchart illustrating the procedure of broadcast upon generating a group. In order to enable this broadcast, a packet is provided with a packet ID 31 that is identified uniquely as stated above, and the communication terminals 101 to 116 are provided with a receive history table 14 that stores the receive history. A hash value of the payload 40 may be used instead of the packet ID 31.

First, it is determined whether it is a communication terminal that starts communication (step 501). If so, adding all adjoining terminals to the send list (step 508), setting the packet ID 31 of the packet to its own station's (step 506), then transferring the packet to all communication terminals in the send list (step 507).

If not the terminal that starts communication in step 501, receiving the packet (step 502). It is determined whether the received packet is the previously received packet (step 503). If so, the process ends without retransferring. Whether the received packet is the previously received packet or not is determined, depending on whether it is stored in the receive history table 14 shown in FIG. 2. If it is not the previously received packet, then adding the packet ID 31 to the receive history table 14 (step 504). Thereafter, adding the adjoining terminals except for the sending terminal to the send list (step 505), setting the packet ID 31 of the packet to its own station's (step 506), and transferring the packet to all communication terminals in the send list (step 507). Repeating this procedure, the information can be transmitted to all adjoining communication terminals. Transmission necessarily end with a finite number of times (that is the same as the number of links in the network).

Figure 9:
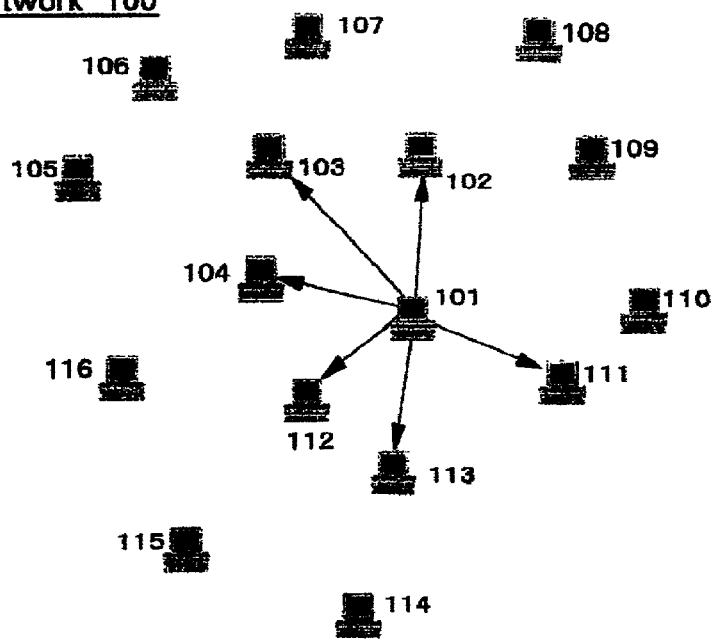
FIG. 9 shows the condition of broadcast over the network 100 at the first hop.
Figure 10:
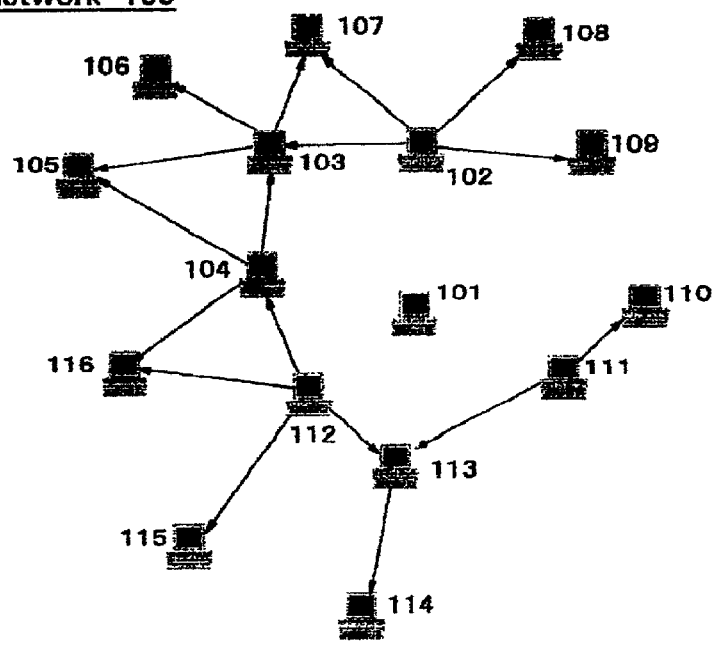
FIG. 10 shows the condition of broadcast over the network 100 at the second hop.
Figure 11:
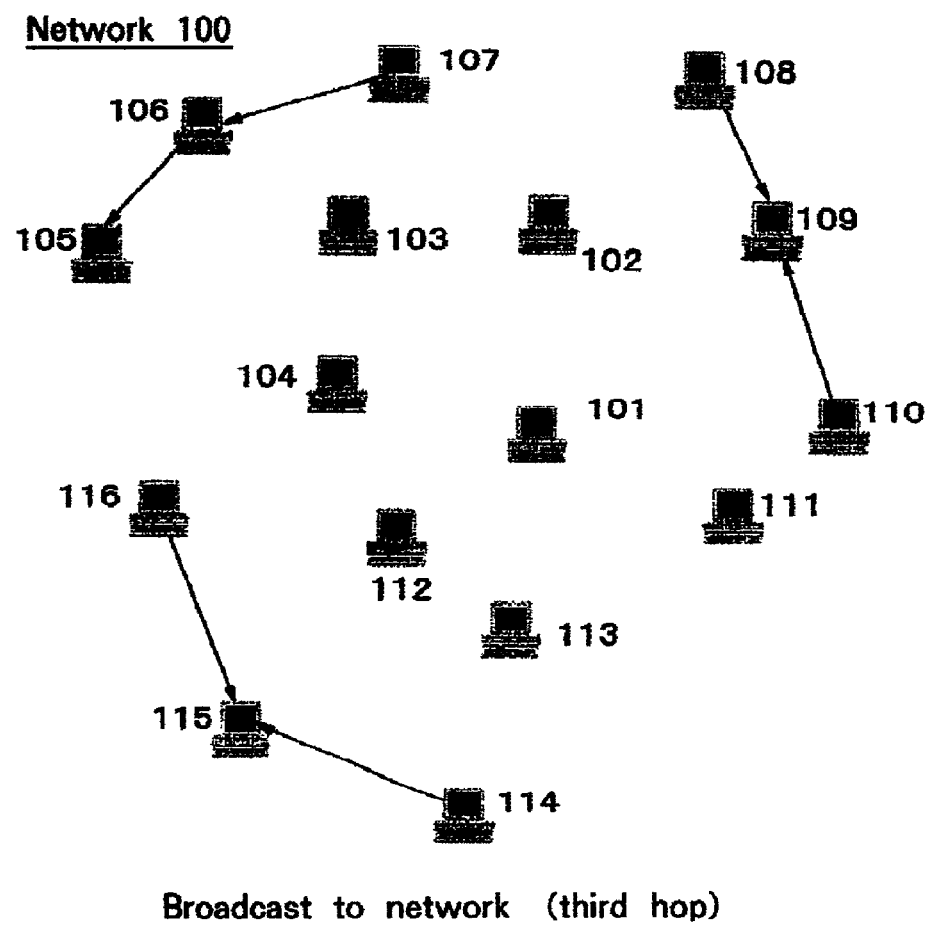
FIG. 11 shows the condition of broadcast over the network at the third hop.

Next, referring to FIG. 9 to FIG. 17, it is described about the condition of broadcast and of group generation upon participating in the group, stage-by-stage. Note that FIG. 9 to FIG. 11 are diagrams illustrating the stages of broadcast, while FIG. 12 to FIG. 17 are diagrams illustrating the conditions of group generation. FIG. 9 shows the condition of broadcast over the network 100 at the first hop, where the communication terminal 101 sends a packet to adjoining communication terminals 102, 103, 104, 111, 112 and 113 that are within a coverage; the packet includes a valid time period of packet 32 and a belonging to group time period 36, etc., as well as group information. At this point, at the communication terminal 101, a group that includes no members is registered with the group management table 11. The communication terminal 104 in the group that has received the packet, for example, generates a new group in the group management table 11 based on the information included in the packet, and registers the terminal 101 along with its time period.

FIG. 10 shows the condition of broadcast over the network 100 at the second hop, where the communication terminals 102, 103, 104, 111, 112 and 113 that received the packet in the first hop, likewise transfer the packet to adjoining communication terminals. At this point, no packets are transferred to the communication terminal 101 corresponding to a sending terminal. For example, the communication terminal 104 sends the packet to adjoining communication terminals 116, 105 and 103, however, it does not send to the adjoining terminal 112 since the adjoining terminal 104 previously received a packet from the adjoining terminal 112.

FIG. 11 shows the condition of broadcast over the network 100 at the third hop, where the communication terminals 105, 106, 107, 108, 109, 110, 114, 115 and 116 that received the packet in the second hop, likewise as mentioned above, transfer the packet to adjoining communication terminals except for a sending terminal that previously transferred. For example, the communication terminal 106 transfers to the communication terminal 105, however, since the communication terminal 106 previously received a packet from the communication terminal 107, then the communication terminal 106 does not send a packet to the communication terminal 107.

Figure 12:
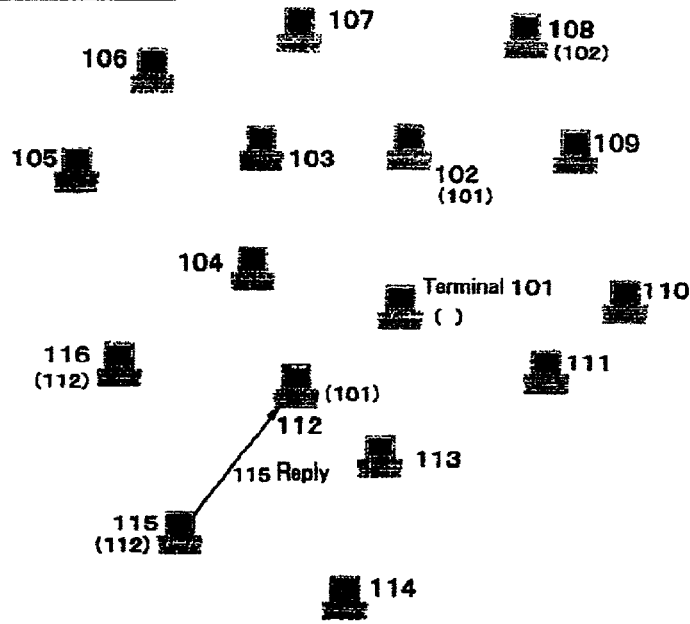
FIG. 12 shows the first stage of communication in a group.

FIG. 12 shows the first stage of communication in a group, where a communication terminal that is interested in packet transfer as a group, sends a reply to the transmission source. In the figure, there is shown that the communication terminal 115 where the packet was transferred sends a return packet by multicast to the communication terminal 112, which corresponds to the transmission source that first transferred a packet. A numeral in parentheses represents a member that exists in the group management table 11 of each communication terminal. For example, in the group management table 11 of the communication terminal 115, there are written the terminal ID of the communication terminal 112 and its time period.

Figure 13:
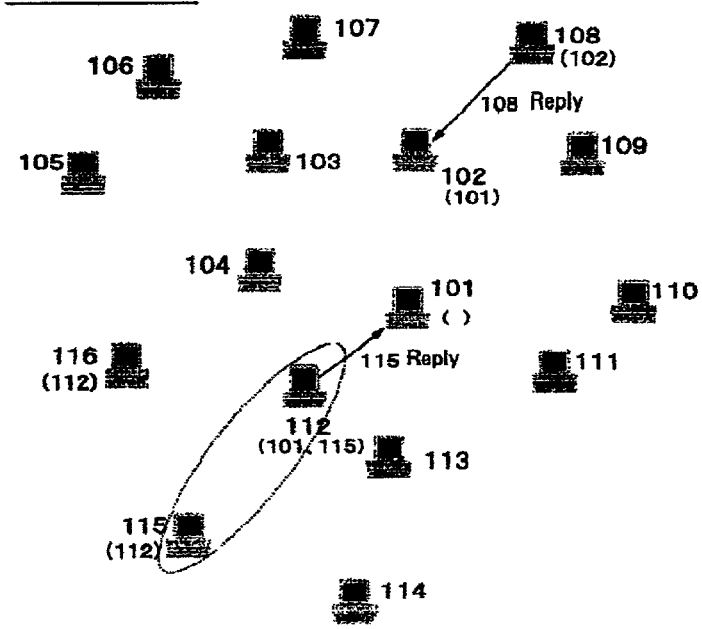
FIG. 13 shows the second stage of communication in a group.

FIG. 13 shows the second stage of communication in a group, where the communication terminal 112 that was given a reply from the communication terminal 115, writes the terminal ID of the communication terminal 115 and its time period as well as the communication terminal 101, in the group management table 11 of the own station. Also, the communication terminal 112 sends the return packet from the communication terminal 115 intact back to the communication terminal 101, which is the originator. Before this sending back, the information such as terminal IDs that comprise the group has not been stored in the group management table 11 of the communication terminal 101. Dotted line shows that such information as mutual terminal IDs is written to the mutual group management tables 11, and that the group has been formed. Also, it is shown that the communication terminal 108 that has interest as a group sends a reply to the communication terminal 102.

Figure 14:
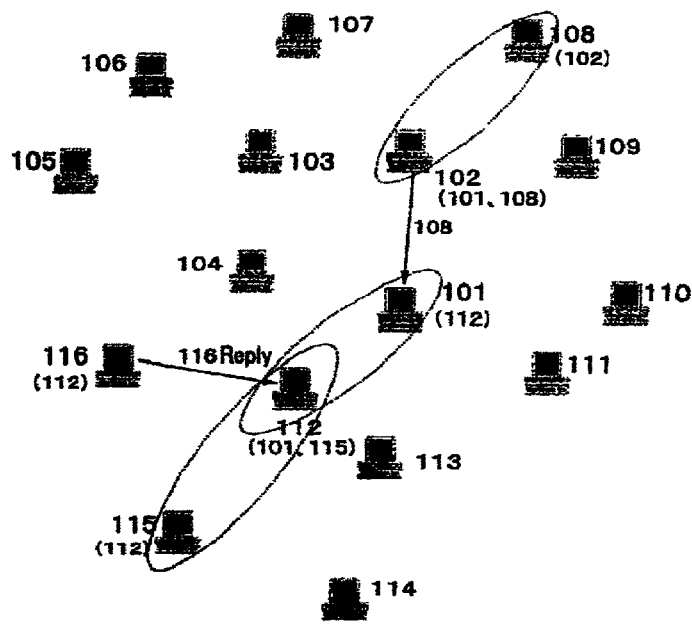
FIG. 14 shows the third stage of communication in a group.

FIG. 14 shows the third stage of communication in a group. Receiving a reply from the communication terminal 112, a group ID 34 and a time period of the adjoining communication terminal 112 are written to the group management table 11 of the communication terminal 102. At this point, the content of the communication terminal 115 that does not adjoin is not written there. Also, the communication terminal 102 that has received a reply from the communication terminal 108 sends a reply to the communication terminal 101. At this point, the terminal ID and the time period of the communication terminal 108 are appended to the group management table 11 of the communication terminal 102. Furthermore, a communication terminal 116 that has interest as a group sends a reply to the communication terminal 112 that corresponds to the transmission source.

Figure 15:
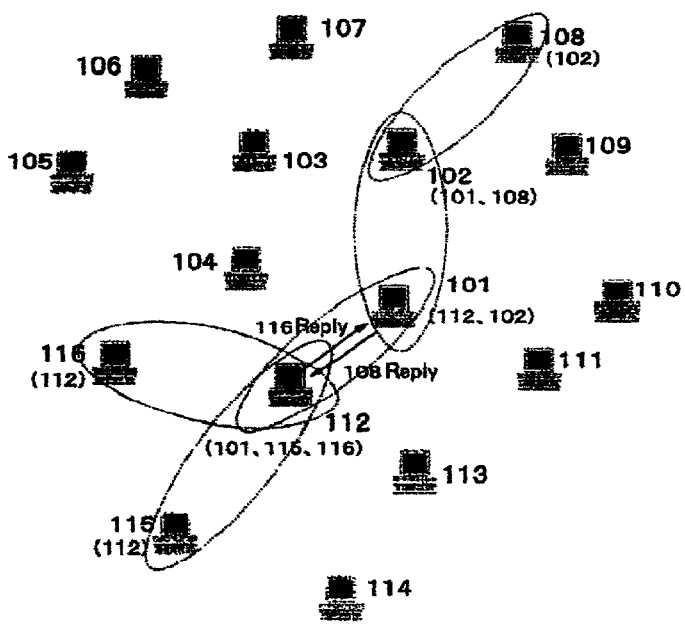
FIG. 15 shows the fourth stage of communication in a group.

FIG. 15 shows the fourth stage of communication in a group, where the communication terminal 112 transfers the reply from the communication terminal 116 to the communication terminal 101, and appends the terminal ID and the time period of the communication terminal 116 to the group management table 11 of the own station. At the communication terminal 101, the terminal ID and the time period of the communication terminal 102 are appended to the group management table 11 of the own station, and send the reply intact that has been received from the communication terminal 108 via the communication terminal 102 to the communication terminal 112.

Figure 16:
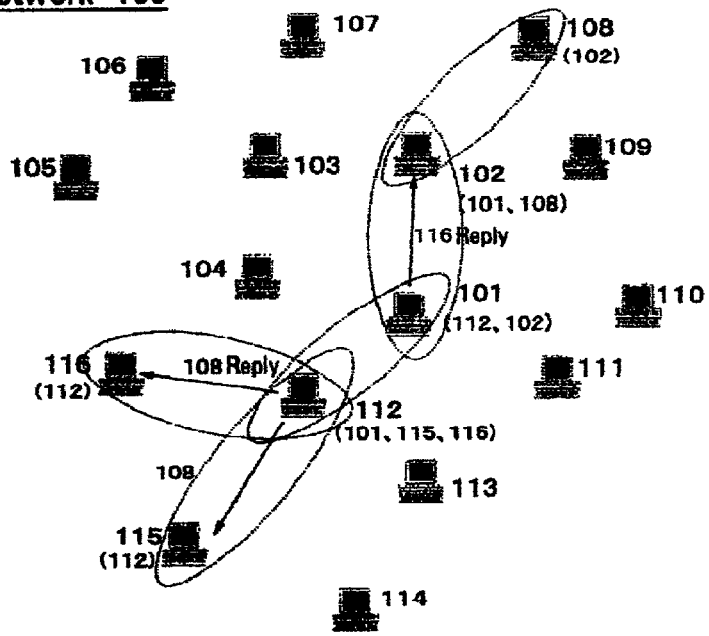
FIG. 16 shows the fifth stage of communication in a group.

FIG. 16 shows the fifth stage of communication in a group. Receiving a reply from communication terminal 108 via the communication terminal 101, the communication terminal 112, based on the terminal IDs and the time periods of communication terminals 115 and 116 that are stored in the group management table of the own station, transfers the reply from communication terminal 108 to the communication terminals 115 and 116. Likewise, the communication terminal 101 transfers a reply from communication terminal 116 to the communication terminal 102. Note that a reply from communication terminal 115 is no more transferred since the time period of communication terminal 115 has expired.

Figure 17:
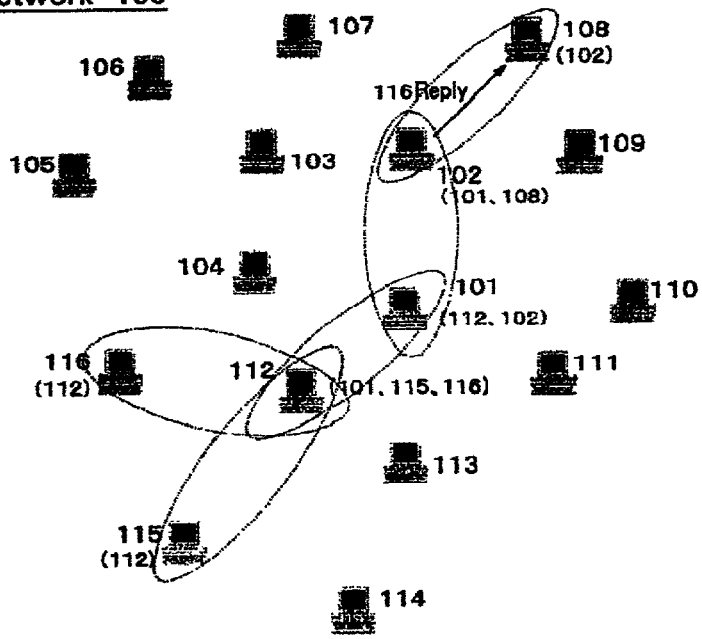
FIG. 17 shows the sixth stage of communication in a group.

FIG. 17 shows the sixth stage of communication in a group. Likewise, the communication terminal 102 transfers the reply from communication terminal 116 to the communication terminal 108.

In this way, the group management tables 11 owned by each communication terminals 101 to 116 are sequentially updated according to the packet transfer. If the time period of a terminal ID stored by the group management table 11 expires, it is deleted from the registration and precluded from a member on the management list.

Now it will be described about an application of direct sequence according to the present invention. For example, assuming that the coverage of a radio wave is several tens of meters. Communication terminals 101 to 116 regularly broadcast their own IDs and spreading codes by means of a common control code among all communication terminals. The cycle should be several tens of milliseconds, and the communication of control codes is intercepted with the frequency of once in several seconds for the same period of time as this cycle, in order to receive the IDs of surrounding communication terminals. Hereby all communication terminals 101 to 116 are able to know the IDs and spreading codes of adjoining communication terminals, and to always have latest information about adjoining terminals.

Also, according to the embodiment of the present invention, since the information about adjoining terminals are known in advance, the connection can be established in a moment of time. Assuming that it takes about 5 ms to establish a connection and to send one packet, and that the communication of five hops or so is expected in an environment where there are about five adjoining terminals on average in the coverage, the life time of packets should be about 150 ms and the life time of group should be about 300 to 500 ms.

In view of a time for surrounding terminals to specifically take and a life time of a group, it is conceivable as an application that pedestrians unconsciously exchange information.

Using such direct sequence, twenty-nine times of transfers are performed in the case of broadcast on each origination of each packet. According to the embodiment of the present invention, only required minimum packets are reproduced on and after the second communication, thereby dramatically reducing the traffic in the network. For example, in the network 100 shown in FIG. 9 to FIG. 17, packet transfers are performed twenty-nine times in the first broadcast, and eleven times in the following three stages, thus total forty times of packet transfers are performed. Doing it all by broadcast, 116 times of transfers are needed. The greater the scale of network becomes, the greater this tendency becomes. Also using a conventional multicast such as ODMRP, a control for maintaining a multicast group is always necessary, however, such a group management is wholly meaningless in the case of application such as pedestrians that happen to pass by. According to the embodiment of the present invention, it is possible to eliminate those unnecessary communications and group management and to prevent wasting the resources of handheld devices.

Next an application of frequency hopping scheme according to the present invention will be described. Here assuming to use Bluetooth that is the most representative short range wireless communication as a wireless communication technology. Bluetooth, where users set 79 channels of 1 MHz bandwidth in the ISM (Industrial Scientific Medical) band of 2.4 GHz that users can use without a license, is to send and receive the radio wave by means of spread spectrum technique of frequency hopping scheme, where the channels are switched 1600 times a second. The coverage of Bluetooth is about 3 to 10 m. The time for a communication terminal to search for surrounding terminals is defined to be 10.24 s or greater per once. Therefore, a use environment is necessary where communication terminals are densely crowded compared to the above-mentioned example and stable. For example, information exchange between passengers on a commuter train corresponds this situation.

Making a list of adjoining terminals regularly for this search time of 10.24 s, as was mentioned earlier, is unrealistic. Therefore, it is effective to do this upon broadcast associated with group generation. Likewise as above, considering a communication in the range of five hops, it takes 51.2 s only for searching. Though the connection establishment is faster than this, it takes 640 ms on average, so that it is estimated to take about 16 s as a whole. Since the actual transmission time of packets are small enough to be ignored, the life time of packets may be about 70 s. Communication between terminals that have been connected once, can be restored with a far short time, thus the life time of the group may be about 75 to 80 s. Owing to such periods of time, communication is possible based on humans' input. Also, since the movement of humans on a train is estimated to be several minutes, the network can be considered stable enough during communication.

In the case of such frequency hopping, it seems that in an ad-hoc environment, a search for communication terminals is necessary each time of broadcast. Therefore, with the method that entirely relies on broadcast, only one packet can be transmitted in a minute, resulting in no practical use. Also, the power consumption is significant in order for a communication terminal to always transmit a search packet. In addition, using the conventional multicast scheme, it is necessary to monitor the movement of terminals, resulting in a broadcast of group members with a frequency of once a minute at lowest, so that it is impossible to transmit information at all.

According to the embodiment of the present invention, though it takes some time to form a group, communications in the group are thoroughly practical. When a communication terminal 101 moves out of range in FIG. 17, the group is divided, however, even in such a case, communications continue without a break among the remaining members in the group. In such an application as information exchange among strangers, rather than a communication is interrupted for a long time by a re-broadcast, it is preferable that a communication is continued in a reduced group among more stable communication terminals, as was mentioned in the embodiment of the present invention.

As mentioned above, according to the present invention, in an on-demand type of communication, a bi-directional communication becomes possible in a party composed of an unspecified number of terminals that share a topic. Also, it is possible to reduce a traffic in the network among the same group, as well as to reduce power consumption of a communication terminal.

The invention has been described with reference to several specific embodiments. One having skill in the relevant art will recognize that modifications may be made without departing from the spirit and scope of the invention as set forth in the appended claims.

Having thus described the invention, what is claimed is:

1. A communication method for performing a group communication among a group comprising a plurality of communication terminals, comprising the steps of:
   setting a valid group time period on each of said plurality of communication terminals, wherein said valid group time period is longer than a time for back-and-forth transfer of a communication packet between adjoining communication terminals, and shorter than an expected time for said communication terminals to go out of communication range based on monitoring; and
   communicating among a group of remaining said communication terminals, said group comprising any communication terminal that has a terminal time period that does not exceed said set valid group time period.

2. The communication method according to claim 1, wherein said group communication is performed in a wireless ad-hoc network that has a rearrangement frequency of connection higher than a communication frequency due to the movement of said communication terminals.

3. The communication method according to claim 1, wherein said each of said communication terminals performing said group communication has information regarding its own terminal time period to belong to the group, information about adjoining terminals belonging to said group, and information about terminal time periods for said adjoining terminals to belong to the group.

4. A communication method to perform on-demand group communication among a group comprising a plurality of communication terminals, comprising the steps of:
- a first communication terminal that communicates sending a packet including appended information about a valid group time period of the group, as well as its own identification information wherein said valid group time period is longer than a time for back-and-forth transfer of a communication packet between adjoining communication terminals, and shorter than an expected time for said communication terminals to go out of communication range based on monitoring;
- each successive communication terminal among said plurality of communication terminals receiving said packet, storing said identification information and the information about said valid group time period that are included in said packet, and designating the valid group time period of the group as the valid terminal time period for said successive communication terminal; and
- performing said group communication by each of said plurality of communication terminals transferring a packet based on the stored identification information and the information about said valid group time period.

5. The communication method according to claim 4, wherein at least one of said plurality of communication terminals that receives said packet stores said identification information and the information about said valid group time period in a management table for each group.

6. The communication method according to claim 4, wherein at least one of said plurality of communication terminals performing said group communication determines whether the valid group time period has been exceeded based on the stored information about said valid group time period, and prohibits transferring a new packet to any of said plurality of communication terminals that have a terminal time period that exceeds said valid group time period.

7. The communication method according to claim 5, wherein at least one of said plurality of communication terminals performing said group communication determines whether the valid group time period has been exceeded based on the stored information about said valid group time period, and prohibits transferring a new packet to any of said communication terminals that have a terminal time period that exceeds said valid group time period.

8. A communication method for performing a group communication in a wireless ad-hoc network that has a rearrangement frequency of connection higher than a transmission frequency of communication packets due to the movement of communication terminals, comprising the steps of:
- forming a group comprising a plurality of communication terminals that communicate;
- defining a valid packet time period for packets for said group; providing a group life time to said group said group life time being at least twice the valid packet time period;
- communicating said group life time to each of said plurality of communications terminals in said group; and
- providing decentralized management of said group based on the life time of said communication terminals.

9. The communication method according to claim 8, wherein the group life time of said group is updated by the transmission of packets.

10. A communication terminal that enables an on-demand group communication among a group comprising a plurality of communication terminals, comprising:
- time period setting means for setting a valid group time period during which said terminal belongs to the group wherein said valid group time period is longer than a time for back-and-forth transfer of a communication packet between adjoining communication terminals, and shorter than an expected time for said communication terminals to go out of communication range based on monitoring; and
- communication means for sending a packet, said packet comprising information about said valid group time period set by said time period setting means, as well as terminal identification information, to a group of remaining communication terminals, said group comprising any communication terminal that does not have a terminal time period that exceeds said set valid group time period.

11. The communication terminal according to claim 10, wherein said time period setting means sets its own terminal time period based on a received valid group time period received from an adjoining terminal.

12. A program storage device readable by machine tangibly embodying a program of instructions for said machine to perform a method for conducting group communications among a group comprising a plurality of communication terminals, wherein said method comprises the steps of:
- setting a valid group time period on each of said plurality of communication terminals, wherein said valid group time period is longer than a time for back-and-forth transfer of a communication packet between adjoining communication terminals, and shorter than an expected time for said communication terminals to go out of communication range based on monitoring; and
- communicating among a group of remaining said communication terminals, said group comprising any communication terminal that has a terminal time period that does not exceed said set valid group time period.

13. A communication method for providing at least one communication packet among a group comprising a plurality of communication terminals, comprising the steps of:
- setting for each packet, a valid packet time period that is longer than a time for back-and-forth transfer of said communication packet and that is shorter than an expected time for said communication terminals to go out of communication range based on monitoring; and
- performing on-demand communication in said group within said set valid packet time period.

14. A program storage device readable by machine tangibly embodying a program of instructions for said machine to perform a method for conducting group communications among a group comprising a plurality of communication terminals, wherein said method comprises the steps of:
- setting for each packet, a valid packet time period that is longer than a time for back-and-forth transfer of said communication packet and that is shorter than an expected time for said communication terminals to go out of communication range based on monitoring; and
- performing on-demand communication in said group within said set valid packet time period.

15. A cellular phone that enables an on-demand type of group communication, comprising:
- time period setting means for setting a valid group time period during which said cellular phone itself belongs to a group wherein said time period setting means sets said valid group time period that is longer than a time for back-and-forth transfer of a packet and is shorter than an expected time for itself to go out of communication range; and communication means for sending a packet with appending the information about said valid group time period set by said time period setting means, as well as its own identification information.

16. The cellular phone according to claim 15, wherein said time period setting means sets its own valid terminal time period based on a received group valid time period received from an adjoining cellular phone sent from that adjoining cellular phone.

* * * * *